United States Patent
Zack et al.

(10) Patent No.: US 9,148,822 B2
(45) Date of Patent: Sep. 29, 2015

(54) COORDINATED DIGITAL RADIO DISTRIBUTION ARCHITECTURE

(71) Applicant: Alvarion Ltd., Tel Aviv (IL)

(72) Inventors: Rafi Zack, Kiryat-Ono (IL); Tomer Goshen, Tel Aviv (IL)

(73) Assignee: ALVARION Ltd., Tel Aviv (IL)

( * ) Notice: Subject to any disclaimer, the term of this patent is extended or adjusted under 35 U.S.C. 154(b) by 164 days.

(21) Appl. No.: 13/779,789

(22) Filed: Feb. 28, 2013

(65) Prior Publication Data

US 2014/0241258 A1 Aug. 28, 2014

(51) Int. Cl.
*H04W 28/18* (2009.01)
*H04W 72/12* (2009.01)

(52) U.S. Cl.
CPC .............. *H04W 28/18* (2013.01); *H04W 72/12* (2013.01)

(58) Field of Classification Search
CPC .... H04B 7/024; H04L 5/0023; H04L 5/0053; H04W 16/18; H04W 24/00; H04W 24/02; H04W 28/048; H04W 48/16; H04W 72/042; H04W 72/08
See application file for complete search history.

(56) References Cited

U.S. PATENT DOCUMENTS

| 2007/0274279 A1* | 11/2007 | Wood et al. ................ 370/343 |
| 2010/0093391 A1* | 4/2010 | Saban et al. .............. 455/552.1 |
| 2013/0017863 A1* | 1/2013 | Kummetz et al. ......... 455/562.1 |

* cited by examiner

*Primary Examiner* — Yong Zhou
(74) *Attorney, Agent, or Firm* — Pearl Cohen Zedek Latzer Baratz LLP (57) ABSTRACT

A communication system architecture is provided, having an aggregator, arranged to centralize the access units and coordinate the radio signals of access units of different types digitally, and remote radio units configured to be modularly connectable to different types of radio elements that correspond to the access units and arranged to communicate with the aggregator digitally. Radio signals are scheduled and delivered with respect to the types of the access units and of the radio elements, and the aggregator is further arranged to handle distribution and combining of the radio signals digitally. The aggregator further comprises a controller arranged to continuously optimize communication with respect to the access units and user mobile communication devices by applying a decision process to cost functions that depends on communication parameters to derive specified dynamically changing parameters, and to manage the aggregator dynamically with respect thereto.

21 Claims, 7 Drawing Sheets

COORDINATED DIGITAL RADIO DISTRIBUTION ARCHITECTURE

BACKGROUND OF THE INVENTION

1. Technical Field

The present invention relates to the field of wireless communication, and more particularly, to a system architecture for management and coordination of multiple distributed remote radio units.

2. Discussion of Related Art

There is an ever growing need for faster communication with larger capacity, especially regarding cellular communication in crowded areas. One example is the distributed antennas system (DAS).

DAS system may be passive or active. Passive DAS uses passive components to distribute the RF signal. These passive components are coax cable, splitters, terminators, attenuators, circulators, couplers and filters (duplexer, diplexer or triplexer). Planning DAS includes calculating the maximum loss from base station to each antenna in the systems and the link budget for the particular area that each antenna covers. The passive DAS design needs to adapt to the limitation of the building regarding the restriction to where and how the heavy coax cable can be installed. A detail site survey of the building needed to be done to make sure that there are cable routes to all antennas.

Active DAS consists of a master unit (MU) connected to multiple expansion units (EU) with optical fiber up to 6 km in length. Each EU in turns connects to multiple remote units (RU) with thin coax or CATS cable up to 400 m in length. The MU controls and monitors the performance of the DAS. The UEs are distributed throughout the building and the RUs are installed close to the antenna. Active DAS has the ability to compensate for the losses of the cables interconnecting the components in the system by using internal calibrating signals and amplifiers. It does not matter what the distance between the antenna and the base station, all antennas in an active DAS will have the same performance (same noise figure and downlink power).

Both active and passive DAS suffer from several disadvantages. On the UL side the SNR is sensitivity limited due to the contribution of noise level from each RU reception signal. Furthermore, the brute force combining of all the RUs, could add interferences from RUs that don't receive any UE and "contribute" only interferers. On the DL side, the same signal is transmitted via all the RU's although it could contain irrelevant traffic for other spotted areas. That would cause DL interference for the macro deployment, neighbor small cells and redundant use of the radio resources. The DAS being RAN agnostic create a situation where the UL/DL signals couldn't be dynamically coordinated with respect to the RU. It would be agnostic to dynamic of the network traffic.

Another indoor solution is the small cell approach, deploying small IP-based cells as standalone small base stations with an integrated radio, baseband, and antenna unit. Base stations typically have integrated antennas, but sometimes antennas come separately. Femtocells can sit on desks, or mount on walls. Generally, picocells and femtocells connect to an IP Ethernet cable as backhaul and in some cases, receive power over Ethernet. The small cell solution is based on deployment of Femto Access Points (FAP) or Pico cell that coordinated by SON (Self Organizing Network) management entity. The FAPs are connected to the Femto gateway via ethernet cables and the Femto-GW that concentrates all the FAPs is connected to the core network entities (SGSN and MCS) or Evolved Packet Core (ePC). Small cells mainly come to provide capacity solution, but it has some challenges and limitations. Since it is most likely that the femto deployment would be in frequency reuse (Reuse one), the system suffers from UL and DL interference between FAPs. Furthermore, the small cell deployment suffers from ping pong handovers due to the multitude of cells within a relevant small area. As a result it harms the QoE in mobility scenarios. Another disadvantage is the lack of effective utilization with regard to number of supported users, meaning that each small cell has a fixed maximum number of supported users (typically up to 32 active users) and as a result it could not support "hot zone" scenarios where many users are located near a single FAP.

There are systems that use a coordinated small cells solution based on a local controller. The local controller unifies all small cells within each cluster and provides overall traffic aggregation and mobile session management for all services delivered through the cluster. Although it possesses a coordination element the coordination inputs are limited to the information provided by L3 and the outputs are limited to the small cell flexibility.

BRIEF SUMMARY OF THE INVENTION

One aspect of the present invention provides a communication coordination system comprising an aggregator, arranged to centralize and coordinate radio signals of a first plurality of access units of different radio access technology types digitally; and a second plurality of remote units configured to be modularly connectable to different radio access technology types of radio elements that correspond to the access units and arranged to communicate with the aggregator digitally. The aggregator is arranged to handle distribution and combining of the radio signals digitally according to specified dynamically changing parameters that are derived by applying a decision process to at least one cost function that depends on communication parameters that are analyzed by the aggregator.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
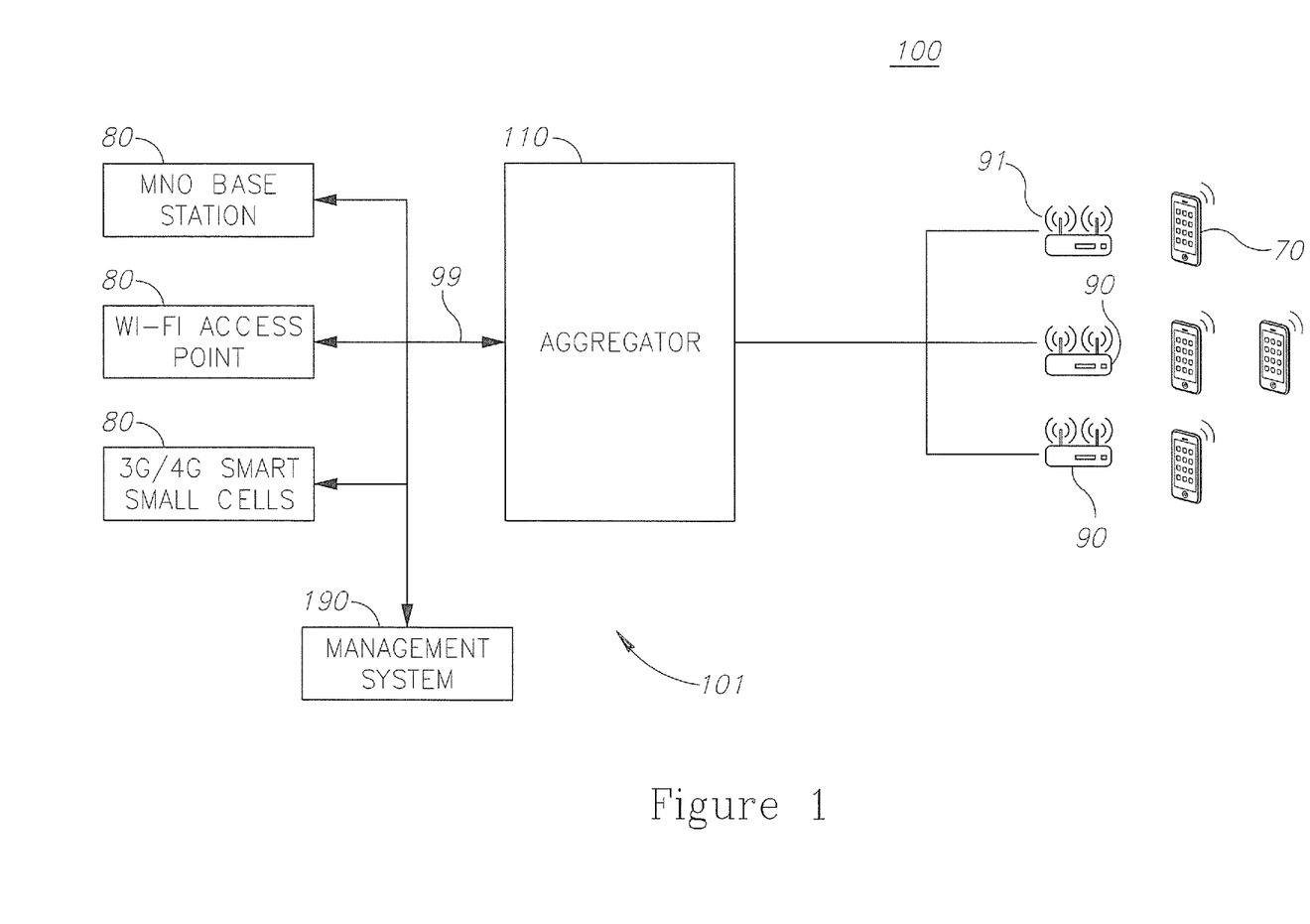
FIG. 1 is a high level schematic block diagram of a communication system, according to some embodiments of the invention.

FIG. 1 is a high level schematic block diagram of a communication coordination system 100, according to some embodiments of the invention. Communication coordination system 100 is arranged to handle access units 80 of various radio access technology types (e.g. any mobile network operator (MNO) base station, WiFi access points, 3G/4G smart small cells, etc.) providing radio signal communication to user communication devices (UEs) 70 via remote radio units (also termed remote units or RUs) 90 of radio access technology types corresponding to the types of access units 80, having radio elements 91.

Communication system 100 comprises an aggregator 110 that is arranged to handle radio signals from access unit 80 and remote units 90 digitally, modularly with respect to access unit types and under continuous optimization of communication parameters. The RF signals from access units 80 are distributed from aggregator 110 towards remote units 90 in digital baseband form, through optical fibers. In addition, fast control signaling (low latency) and command/messages channels are also distributed from aggregator unit 110 to and from remote units 90 over the same optical fiber. Communication and optimization are controlled by a management system 190. Aggregator 110 and management system 190 are referred to in the following as coordination system 101 that coordinates digitally radio signals between access units 80 and remote units 90 in communication system 100.

Figure 6:
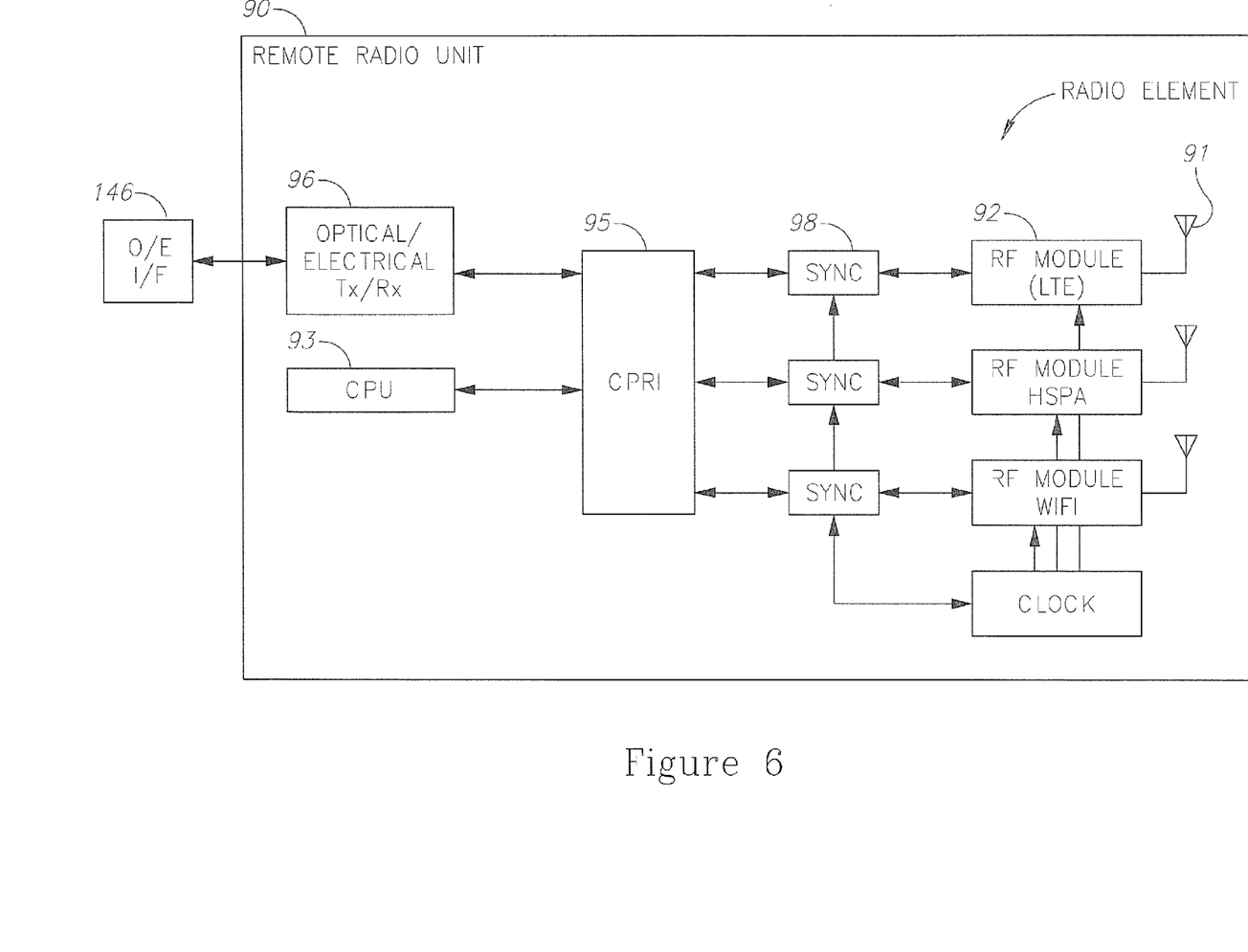
FIG. 6 is a high level schematic block diagram illustrating the remote radio unit, according to some embodiments of the invention.

Aggregator 110 mediates, centralizes and coordinates communication of access units 80 in digital manner with respect to generic remote units 90 that receive radio elements 92 modularly (see FIG. 6). In system 100, aggregator 110 and remote units 90 tag data chunks with respect to access units 80 and remote units 90 and handle the distribution and combining of the radio signal digitally with respect to the tagged data chunks. Aggregator 110 coordinates, processes and controls the radio signals between access units 80 and remote units 90 in digital form.

Figure 2:
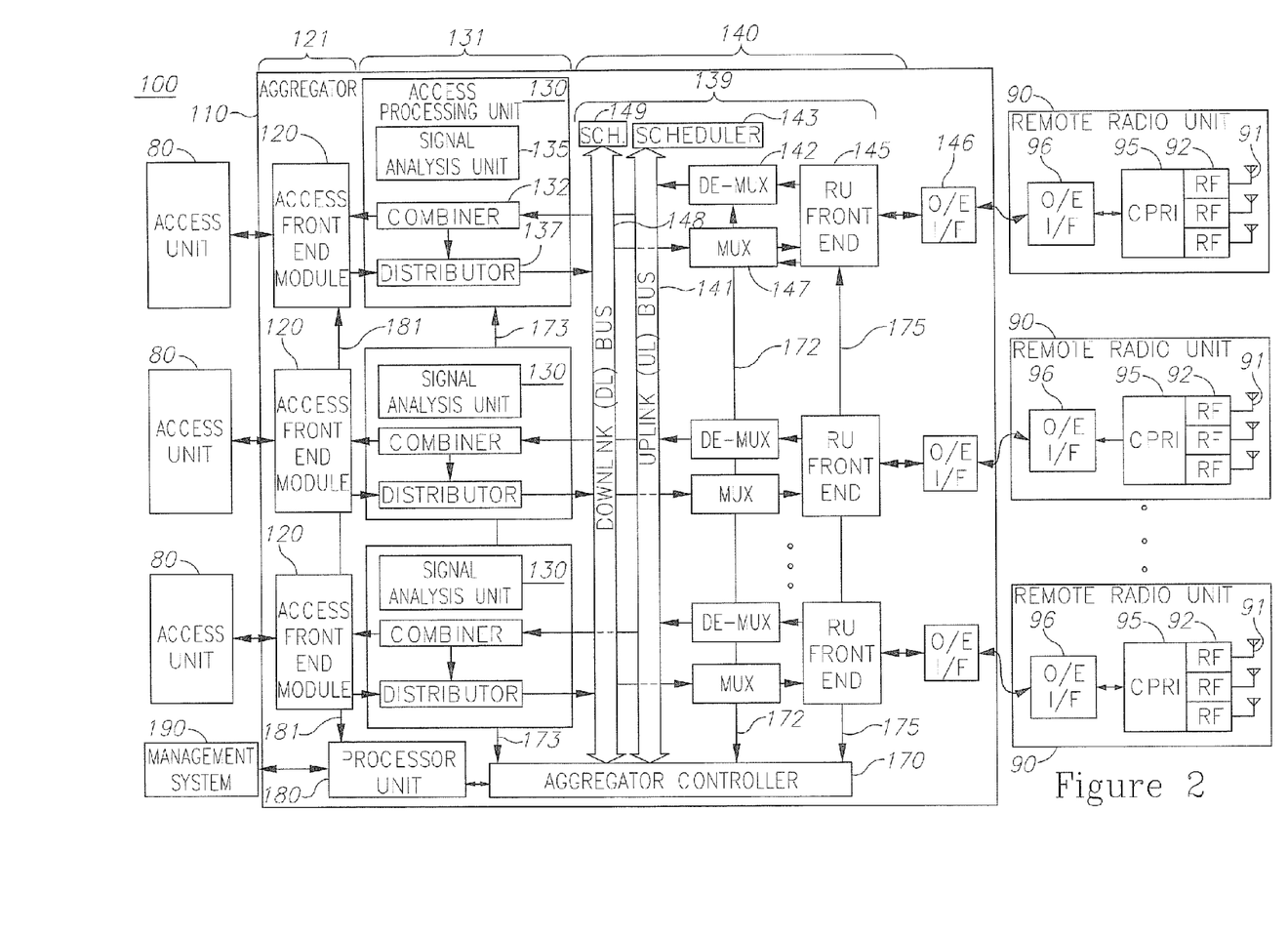
FIG. 2 is a high level schematic block diagram of a detailed view of the communication system comprising access units, an aggregator and remote units, according to some embodiments of the invention.

FIG. 2 is a high level schematic block diagram of a detailed view of communication system 100 comprising access units 80, aggregator 110 and remote units 90, according to some embodiments of the invention.

Aggregator 110 comprises a controllable resource access plane 121, a signal processing and analysis plane 131 and a distribution plane 140, and continuously optimizes communication with respect to access units 80 and user mobile communication devices 70 by applying a decision process to at least one cost function that depends on communication parameters to derive specified dynamically changing parameters, and managing the aggregator planes dynamically with respect thereto.

In embodiments, communication parameters comprise at least one of: a received signal strength, a signal auto-correlation and inter signal cross-correlations. In embodiments, the specified dynamically changing parameters may comprise weights applied to combiners 132 and to distributers 137 and/or weights relating to remote units 90 with respect to user communication devices 70 communicating therethrough.

Aggregator 110 comprises resource access plane 121 having access front end modules 120, each in communication with a corresponding access unit 80. Front end modules 120 serve as adaptors between the aggregator core sections and the specific radio access technology resources. Access front end module 120 converts the access point signal from/to the digital baseband at the required sampling rate. This unit is connected to access processing units 130 through Tx/Rx (transmission/reception) digital baseband interface. Access front end module 120 also provides signal analysis and detection functions to identify the access point Tx signal existence. This function is used to gate the downlink Tx signal when working in TDD mode.

In embodiments in which at least one of access units 80 is a WiFi access unit, aggregator 110 and/or management system 190 may be arranged to provide loop back capability to communication system 100 with respect the WiFi access unit (WiFi automatic).

Aggregator 110 comprises access signal processing and analysis plane 131 with access processing and analysis units 130, each in communication with a corresponding access front end module 120 and comprising a signal analysis unit 135, a combiner 132 arranged to provide uplink radio signals to access front end module 120, and a distributor 137 arranged to receive and tag downlink radio signals from access front end module 120. Tagging refers to the type and identity of corresponding access unit 80. Access processing units 130 perform the required baseband signal analysis and signal pre-processing before sending the signals to the respective radio access technology resource (access unit 80 or remote unit 90), as well as baseband signal post processing before distribution to the target remote radio units 90 as explained in more detail below (see FIG. 4).

Figure 5:
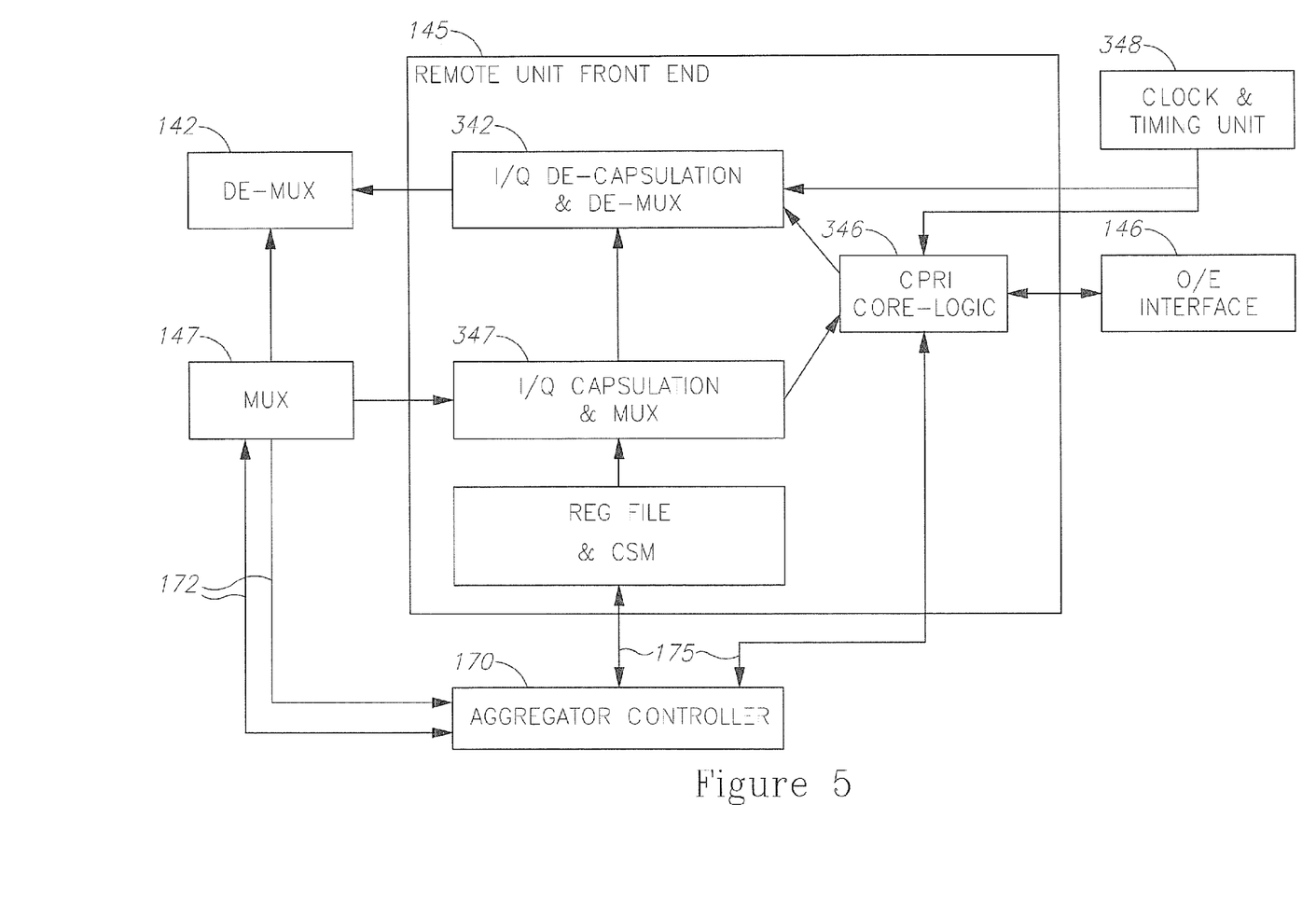
FIG. 5 is a high level schematic block diagram illustrating a remote unit front end of the aggregator, according to some embodiments of the invention.

Aggregator 110 comprises distribution plane 140 comprising a bi-directional signal baseband router 139 and remote unit (RU) front ends 145, the RU front ends 145 in communication with a corresponding remote unit 90 (see FIG. 5). Remote unit front ends 145 communicate with remote unit 90 via corresponding interfaces 146, 96 on the sides of aggregator 110 and remote units 90, respectively. Remote unit front end 145 interfaces between the external remote unit 90 and the aggregator core units. Interfaces 146, 96 may comprise optical (e.g. via fiber optics) or electrical interfaces and are correspondingly denoted as O/E I/F.

RU front-end 145 comprises baseband transport interface with timing and sync support as Common Public Radio Interface (CPRI). CPRI Wrapper in RU front-end 145 is arranged to interface with the aggregator core units and O/E I/F 146 such as small form-factor pluggable (SFP). O/E I/F interfaces 146, 96 transfer optically the digitalized radio signals between RU front-end 145 and an RU wrapping module 95, that also comprises a CPRI (see FIGS. 5 and 6). RU front-end 145 communicates with RU wrapping module 95, according to control data from bi-directional baseband signal router 139.

Bi-directional baseband signal router 139 is arranged to deliver uplink radio signals from remote unit front ends 145 to combiners 132 and to deliver downlink radio signals from distributors 137 to remote unit front ends 145 according to specified dynamically changing parameters.

Baseband signal router module 139 comprises an uplink bus 141 associated with de-multiplexers 142 that are arranged to receive uplink radio signals from corresponding remote unit front ends 145. Uplink bus 141 is arranged to deliver the uplink radio signals to combiners 132. Uplink bus 141 is controlled by a UL bus scheduler 143.

Baseband signal router module 139 further comprises a downlink bus 148 associated with multiplexers 147 that are arranged to deliver downlink radio signals to corresponding remote unit front ends 145. Downlink bus 148 is arranged to receive the downlink radio signals from distributors 137. Downlink bus 141 is controlled by a DL bus scheduler 149.

Schedulers 143, 149 are in communication with an aggregator controller 170 (see below) and receive therefrom scheduling control data based on the specified dynamically changing parameters. The scheduling control data determines the combining and distribution of the digital radio signals with respect to RUs 90. Scheduling of the radio signals may be carried out according to a digital signal sampling rate. De-multiplexers 142 and multiplexers 147 function as the fabric to link the radio signals between access units 80 and remote units 90 according to the specified dynamically changing parameters in a way that optimizes communication, as explained below. The radio signals are cut into data chunks that are tagged and communicated between aggregator 110 and RUs 90 according to the scheduling by UL and DL schedulers 143, 149.

Baseband signal router module 139 as a baseband switch provides the required routing between the selected remote units 90 and access processing units 130. This is done by setting the bi-directional multiplexers 142, 147 with the required instantaneous mapping between remote units 90 and access processing units 130. The switch architecture of baseband router module 139 is based design in multiplication architecture mode where every K RUs 90 are clustered in a switch mux layer. All the uplink signals from all layers (clusters) are combined at access processing units 130 and similarly the downlink signals are respectively distributed to the RU clusters at access processing units 130. The baseband switch can support M clusters of K remote units 90—overall K*M RUs 90, while each RU supports N access units 80. K, M and N are dependent on the maximum switch bit rate that can be implemented with a specific HW platform and the samples width. I.e. it depended on the switch's bus bandwidth.

Aggregator 110 further comprises processor unit 180 arranged to continuously determine the specified dynamically changing parameters by applying a decision process to at least one cost function that depends on communication parameters received from access front end modules 120 and access processing units 130, and in respect to instructions from a management system 190. In embodiments, parts or all of management system 190 may be implemented in some or all of access units 80.

Processor unit 180 is arranged to provide various management entities in aggregator 110 with communication with the external management system 190 for high level configuration, control and monitoring. Processor unit 180 is further arranged to communicate with access units 80, receive their required commands for RU UL/DL signal weighting (see below) and send aggregator 110's internal measurements to access units 80.

Furthermore, processor unit 180 is arranged to generate aggregator 110's commands towards remote units 90 and parse the returned messages from remote units 90 over TCP/IP. Processor unit 180 may also take part in controlling access processing units 130 and other internal units of aggregator 110.

Aggregator 110 further comprises an aggregator controller 170 (see FIGS. 3 and 4) arranged to receive the specified dynamically changing parameters from processor unit 180 and implement them in processing and analysis units 130 and in baseband signal router module 139. Aggregator's processor unit 180 and controller 170 control both the internal aggregator units and remote radio units 90 through a dedicated control channel.

In embodiments, communication system 100 comprising aggregator 110 arranged to centralize and coordinate communication of access units 80 of different types digitally, and remote units 90 configured to be modularly connectable to different types of radio elements 92 that correspond to access units 80 and arranged to communicate with aggregator 110 digitally by chunking data.

Aggregator 110 further comprises controller 170 arranged to continuously optimize communication with respect to access units 80 and user mobile communication devices 70 by applying a decision process to at least one cost function that depends on communication parameters to derive specified dynamically changing parameters, and to manage aggregator 110 dynamically with respect thereto.

In embodiments, aggregator 110 comprises resource access plane 121 interfacing access units 80, distribution plane 140 interfacing remote units 90, and signal processing and analysis plane 131 in communication with controller 170. Signal processing and analysis plane 131 is arranged to provide controller 170 with the communication parameters and apply the specified dynamically changing parameters to signal processing and analysis plane 131.

Each plane communicates with aggregator controller 170 via a respective bus-resource access plane 121 via resource access plane bus 181, signal processing and analysis plane 131 via signal processing and analysis plane bus 173, baseband signal router plane 139 via a baseband signal router bus 172 connecting multiplexers 147 and de-multiplexers 142 to aggregator controller 170 and via a wrapping bus 175 connecting remote unit front ends 145 to aggregator controller 170. Each of buses 181, 173, 172 and 175 is used to deliver the specified dynamically changing parameters and controls from aggregator controller 170 to the respective components of aggregator 110.

Figure 3:
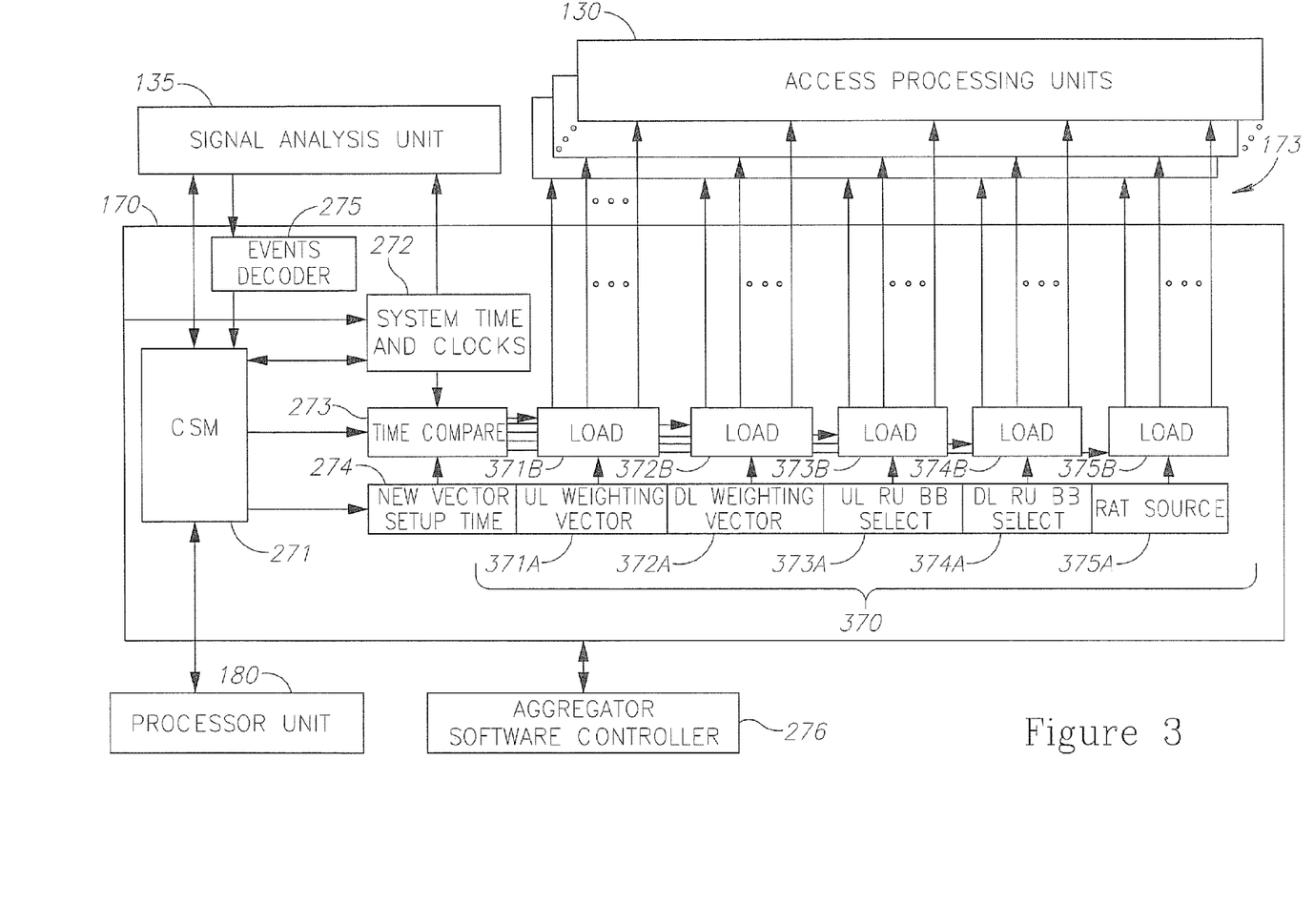
FIG. 3 is a high level schematic block diagram of an aggregator controller, according to some embodiments of the invention.

FIG. 3 is a high level schematic block diagram of aggregator controller 170, according to some embodiments of the invention.

Aggregator controller 170 may include processor unit 180 as hardware or software components embodied therewithin, or may communicate with an external processor unit 180 via a control bus. In embodiments, processor unit 180 may be implemented as an aggregator software controller 276. Processor unit 180 may communicate with remote unit 90 via a control channel based on TCP/IP packets, receive through the control channel operational data and deliver control commands to remote units 90. The aggregator control channel may be used to communicate between aggregator 110 and remote units 90. The main purposes of the control channel are sending RU Tx/Rx path configuration as frequency, bandwidth, gain etc., sending or receiving RU statuses and downloading RU firmware & software.

For example, aggregator commands to remote units 90 may include: Reset, frequency setup, bandwidth (BW) setup, transmission (Tx) gain setup, reception (Rx) gain setup, send status, firmware download etc. Such aggregator commands may implement the specified dynamically changing parameters as derived by processor unit 180 or by aggregator software controller 276. Messages from remote units 90 may comprise for example: Reset completion acknowledgement, setup acknowledgement, RU Status response etc.

Aggregator controller 170 may receive from signal analysis unit 135 communication parameters and radio signal related data that serve as basis for the optimization of communication (e.g. parameters of the cost functions). Aggregator controller 170 may comprise an event decoder 275 that is arranged to identify events in the data received from signal analysis unit 135 (and see below).

Aggregator controller 170 may comprise hardware controllers 370 (see also FIG. 4) that control access processing and analyzing units 130 jointly with processor unit 180. Hardware controllers 370 are timing constraint driven and are synchronized to a single system time and reference clock. Hence, all executions by hardware controllers 370 that are driven whether by its internal state machine or by processor unit 180 are done in a precise time manner with relation to the aggregator system time. Therefore, any action or instantaneous setup is done at exact pre-defined timing. Hardware controllers 370 may operate as drivers of software elements that are part of controller 170 and are involved in operating aggregator 110 and in particular baseband signal router plane 139 according to the specified dynamically changing parameters. Hardware controllers 370 and the software elements may be distinct or united within one module.

In embodiments, aggregator controller 170 comprises a system time and clocks unit 272 receives the external reference clock and generates the various clocks for internal usage. In addition, a system time counter is used for elapsed time to trigger/initiate the processes at access processing and analyzing units 130.

In embodiments, aggregator controller 170 comprises a Configurable State Machine (CSM) and register file unit 271 is pre-configured by processor unit 180 while writing to its register file and generates the internal controls mainly for access processing and analyzing units 130. CSM 271 is driven by both asynchronous events and elapsed system time. In addition, CSM 271 takes care for the scheduled load of the weighting factors and the instantaneous RU selection for both DL and UL.

Signal analyzer event decoder 275 receives the functional outputs from signal analysis unit 135 and generates an event code that is sent directly to CSM 271. CSM 271 generates, in response, the required state transition and control execution. For example, in WiFi mode, where the event decoder identifies an UL signal from a specific RU 90 (e.g. $RU_{UL}$), it sends the code towards CSM 271 that indicates the specific RU 90 with UL signal. CSM 271 generates the command to replace the other RUs to Tx mode (except $RU_{UL}$) to downlink the signal that received by $RU_{UL}$.

In embodiments, aggregator controller 170 comprises setups blocks 371B-375B for access processing units 130, which are driven by CSM 271 following a system time event (scheduled) and takes care to load new information vectors to access processing and analyzing units 130. In particular, the specified dynamically changing parameters are used as weighting factors 371A-375A to optimize communication through aggregator 110.

For example, dynamic parameters words 371A-375A that represent weighting factors may comprise an uplink weighting vector 371A, a downlink weighting vector 371B, an uplink remote unit baseband selection 373A, a downlink remote unit baseband selection 374A, and an access unit source 375A. Dynamic parameters words 371A-375A that represent weighting factors are loaded via respective set-ups blocks 371B-375B to access processing units 130 at time determined by time compare unit 273 associated with aggregator system time unit 272.

Figure 4:
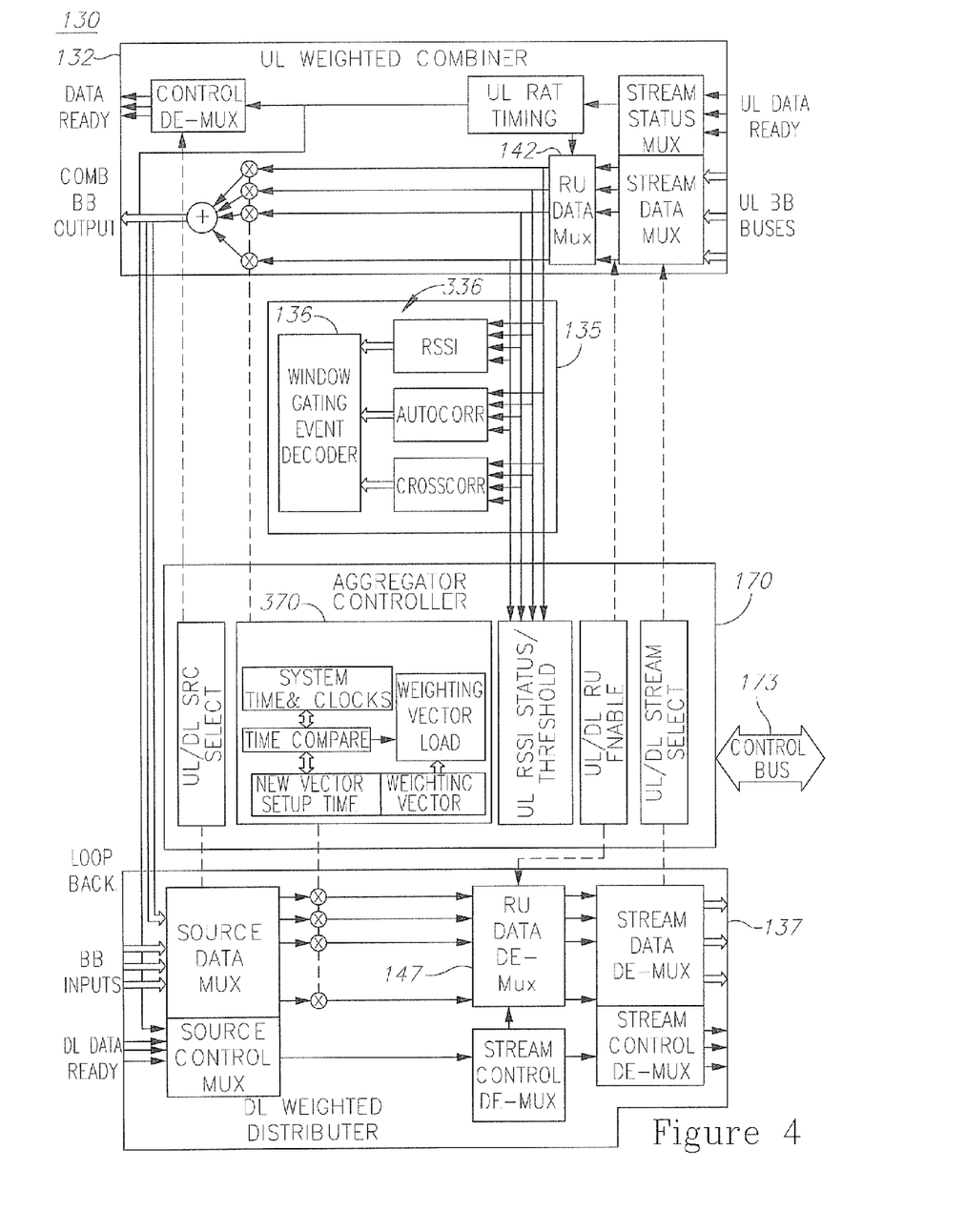
FIG. 4 is a high level schematic block diagram illustrating the access processing and analyzing unit and its dynamic control of communication parameters in the system, according to some embodiments of the invention.

FIG. 4 is a high level schematic block diagram illustrating access processing and analyzing unit 130 and its dynamic control of communication parameters in system 100, according to some embodiments of the invention;

Access processing and analyzing units 130 are aggregator 100's central unit and each comprises four main sections, namely combiner 132 as an uplink signal processor, signal analysis unit 135 as an uplink signal analyzer, distributor 137 as a downlink signal processor and a section of controller 170 as a processing unit controller section.

Combiner 132 as an uplink signal processor performs the UL weighted combining for the collected signals arrived from remote units 90. This is done by collecting the instantaneous remote units 90 samples, multiplying each sample by the relevant remote unit weighting factor and combining the weighted samples. The UL weighting vectors are set by aggregator controller 170 and generated by either external unit or internally (e.g. by management system 190 or processor unit 180). A new UL weighting vector is activated by aggregator controller 170 at pre-set specified system time.

Access processing and analyzing units 130 are capable of independent performance of non-manageable functionalities driven by the aggregator controller 170. Such functionalities may be triggered by signal analysis unit 135 as the uplink signal analyzer. This signal analyzer section performs various signal measurements such as signal energy, signal auto correlation or inter signals cross-correlations for each of the received remote units 90's digital baseband signal. This section consists of RSSI, AutoCorr and CrossCorr estimator bank 336 while each bank output is connected to the signal analyzer event decoder. The event decoder captures the overall remote units 90's signals status and sends that to aggregator controller 170 for further functional decision. The event decoder may open an events window to enable capture the status in specific time slot size.

Distributor 137 as a downlink signal processor operates as a pre-distributed baseband processor. Distributor 137 takes the source baseband signal distributed to number of streams, one stream for every remote unit 90.

FIG. 5 is a high level schematic block diagram illustrating a remote unit front end 145 of aggregator 110, according to some embodiments of the invention, and FIG. 6 is a high level schematic block diagram illustrating remote radio unit 90, according to some embodiments of the invention. Remote unit front end 145 communicates with corresponding wrapping module 95 e.g. via optical fiber connecting interfaces 146, 96 respectively.

Remote unit front end 145 interfaces between the external remote unit 90 and the aggregator core units. RU front-end 145 comprises O/E I/F 146 such as fiber I/F (SFP), a CPRI (Common Public Radio Interface) unit 346 and CPRI wrapper module 345. Aggregator 110 includes several RU frontends units 145 to support external remote unit 90. RU frontend 145 is pre-configured to support several types of remote units 90 corresponding to access units such as 3G, LTE or WiFi with their various bandwidths. CPRI wrapper 345 consists of multiplexers (mux) and de-multiplexers (demux) arranged to stream in and stream out the RU digital baseband samples. A command/messages channel is added to be multiplexed with the baseband samples at the CPRI interface.

Figure 7:
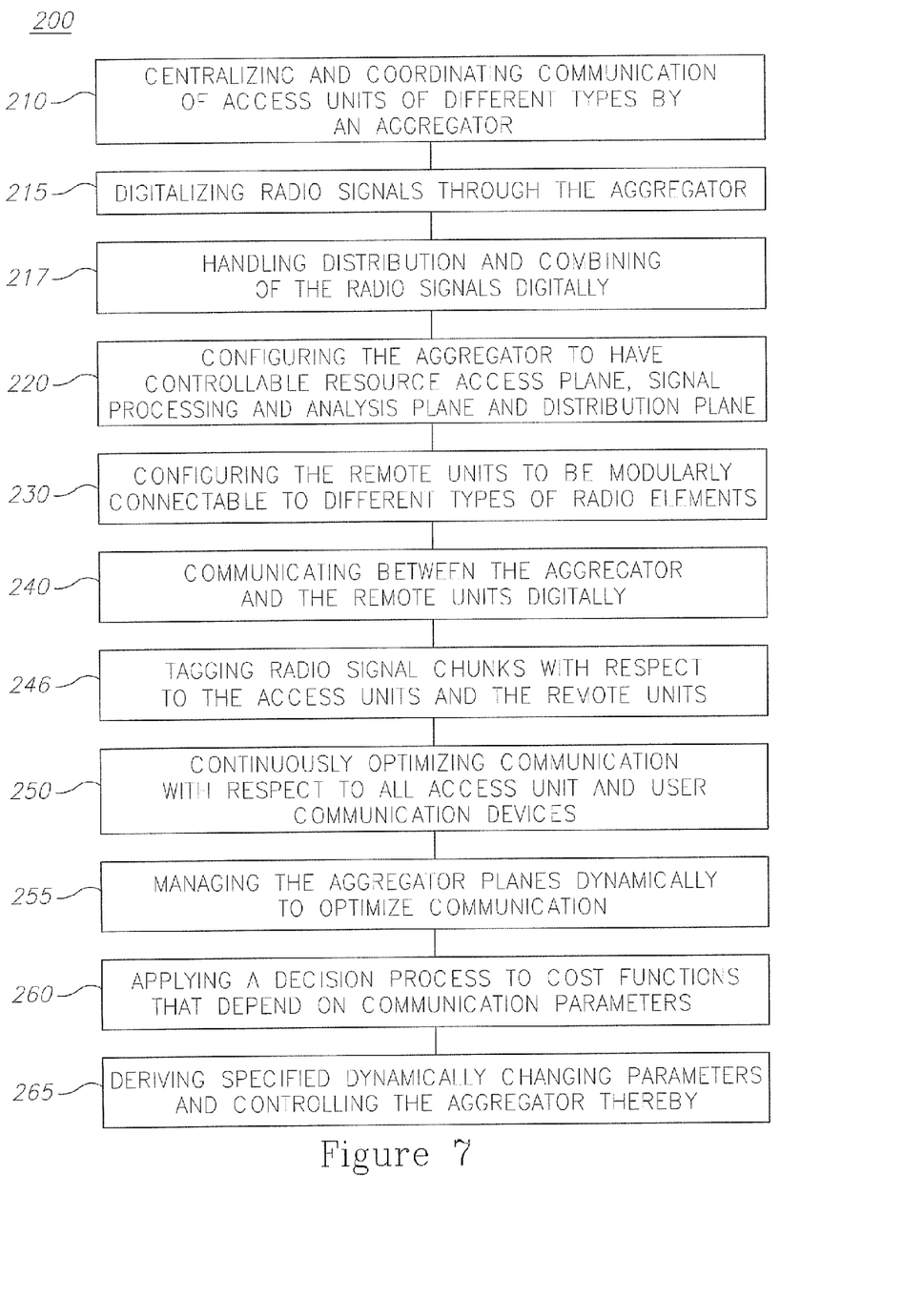
FIG. 7 is a high level flowchart illustrating a method of managing a communication system, according to some embodiments of the invention.

FIG. 7 is a high level flowchart illustrating a method 200 of managing a communication system, according to some embodiments of the invention.

Method 200 comprises the following stage: Centralizing and coordinating radio signal communication of a first plurality of access units of different types by an aggregator (stage 210) and digitalizing radio signal communication through the aggregator (stage 215); configuring a second plurality of remote units to be modularly connectable to different types of radio elements (stage 230) and communicating radio signals between the aggregator and the remote units digitally (stage 240); tagging data with respect to the access units and the remote units (stage 246) and handling distribution and combining of radio signals digitally with respect to tagged data chunks (stage 217).

Method 200 may further comprise configuring the aggregator to have a controllable resource access plane interfacing the access units, a signal processing and analysis plane and a distribution plane interfacing the remote units (stage 220); continuously optimizing communication with respect to all access unit and user mobile communication devices (stage 250) and managing the aggregator planes dynamically to optimize communication (stage 255).

Method 200 may further comprise applying a decision process to cost functions that depend on communication parameters (stage 260) and deriving specified dynamically changing parameters (stage 265) and managing the aggregator planes with respect thereto. The specified dynamically changing parameters may comprise weights applied to the combiners and to the distributers and/or weights relating to the remote units with respect to user communication devices communicating therethrough.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A coordination system for coordinating radio signals in a communication system comprising a first plurality of access units and a second plurality of remote units, the coordination system comprising:
   a management system; and
   an aggregator arranged to coordinate the radio signals between the access units and the remote units, the aggregator comprising:
      a first plurality of access front end modules, each in radio signal communication with a corresponding access unit;
      a second plurality of remote unit front ends, each in radio signal communication with a corresponding remote unit;
      a first plurality of access processing and analyzing units, each in communication with a corresponding access front end module and comprising:
         a signal analysis unit arranged to derive communication parameters of the communication system;
         a combiner arranged to provide uplink radio signals to the access front end module; and
         a distributor arranged to provide downlink radio signals from the access front end module,
      a bi-directional baseband router module arranged to deliver the uplink radio signals from the remote unit front ends to the combiners and to deliver the downlink radio signals from the distributors to the remote unit front ends according to specified dynamically changing parameters; and
      a processor unit arranged to continuously determine the specified dynamically changing parameters by applying a decision process to at least one cost function that depends on the communication parameters in respect to instructions from the management system.

2. The coordination system of claim 1, wherein the specified dynamically changing parameters comprise weights applied to the combiners and to the distributers.

3. The coordination system of claim 1, wherein the specified dynamically changing parameters comprise weights relating to the remote units with respect to user communication devices communicating therethrough.

4. The coordination system of claim 1, wherein the bi-directional baseband router further comprises:
   an uplink bus associated with a second plurality of de-multiplexers that are arranged to receive the uplink radio signals from corresponding remote unit front ends, the uplink bus arranged to deliver the uplink radio signals to the combiners; and
   a downlink bus associated with a second plurality of multiplexers that are arranged to deliver the downlink radio signals to corresponding remote unit front ends, the downlink bus arranged to receive the downlink radio signals from the distributors.

5. The coordination system of claim 4, wherein the bi-directional baseband router further comprises:
an uplink scheduler arranged to schedule the uplink radio signals according to the specified dynamically changing parameters; and
a downlink scheduler arranged to schedule the downlink radio signals according to the specified dynamically changing parameters.

6. The coordination system of claim 5, wherein the scheduling of the radio signals is carried out according to a digital signal sampling rate.

7. The coordination system of claim 1, wherein the aggregator further comprises an aggregator controller arranged to receive the specified dynamically changing parameters from the processor unit and implement them in the bi-directional baseband router and in the access processing and analysis unit.

8. The coordination system of claim 1, wherein the communication parameters comprise at least one of: a received signal strength, a signal auto-correlation and inter signal cross-correlations.

9. The coordination system of claim 1, wherein at least one of the access units is a WiFi access unit and the aggregator is arranged to provide loop back capability with respect thereto.

10. A communication system comprising
a first plurality of access units;
a second plurality of remote units; and
the coordination system of claim 1, configured to coordinating radio signals between the first plurality of access units and the second plurality of remote units.

11. A communication system comprising:
an aggregator, arranged to centralize and coordinate radio signals of a first plurality of access units of different radio access technology types; and
a second plurality of remote units configured to be modularly connectable to different radio access technology types of radio elements that correspond to the access units and arranged to communicate with the aggregator,
wherein the aggregator is arranged to handle distribution and combining of the radio signals according to specified dynamically changing parameters that are derived by applying a decision process to at least one cost function that depends on communication parameters that are analyzed by the aggregator.

12. The communication system of claim 11, wherein the aggregator comprises:
a resource access plane interfacing the access units;
a distribution plane interfacing the remote units; and
a signal processing and analysis plane in communication with a processor unit arranged to continuously derive the specified dynamically changing parameters from the communication parameters in respect to instructions from a management system.

13. The communication system of claim 11, further comprising the management system implemented at least partly in at least one of: the processor unit and at least one of the access units.

14. The communication system of claim 11, wherein the aggregator further comprises an aggregator controller arranged to implement the specified dynamically changing parameters within the aggregator in a temporally precise manner.

15. The communication system of claim 11, wherein the specified dynamically changing parameters comprise weights applied to the digital distribution and combining of the radio signals.

16. The communication system of claim 11, wherein the specified dynamically changing parameters comprise weights relating to the remote units with respect to user communication devices communicating therethrough.

17. The communication system of claim 11, wherein the communication parameters comprise at least one of: a received signal strength, a signal auto-correlation and inter signal cross-correlations.

18. A method of coordinating radio signals in a communication system, the method comprising:
centralizing and coordinating communication of a first plurality of access units of different radio access technology types by an aggregator and digitalizing communication through the aggregator;
configuring a second plurality of remote units to be modularly connectable to different radio access technology types of radio elements that correspond to the access units and communicating the radio signals between the aggregator and the remote units digitally; and
configuring the aggregator to have a controllable resource access plane, a signal processing and analysis plane and a distribution plane, and continuously optimizing communication with respect to the access units and user mobile communication devices by applying a decision process to at least one cost function that depends on communication parameters to derive specified dynamically changing parameters, and managing the aggregator planes dynamically with respect thereto.

19. The method of claim 18, wherein the communication parameters comprise at least one of: a received signal strength, a signal auto-correlation and inter signal cross-correlations, and wherein the specified dynamically changing parameters comprise weights applied to the combiners and to the distributers and weights relating to the remote units with respect to user communication devices communicating therethrough.

20. The method of claim 18, wherein at least one of the access units is a WiFi access unit, and further comprising arranging the aggregator to provide loop back capability with respect thereto.

21. The method of claim 18, wherein specified dynamically changing parameters comprise at least one of weights applied to the combiners and to the distributers and weights relating to the remote units with respect to user communication devices communicating therethrough.

* * * * *